United States Patent
Kraus

(10) Patent No.: US 12,260,620 B2
(45) Date of Patent: Mar. 25, 2025

(54) METHOD FOR PROVIDING A TRAINABLE FUNCTION FOR DETERMINATION OF SYNTHETIC IMAGE DATA

(71) Applicant: Siemens Healthcare GmbH, Erlangen (DE)

(72) Inventor: Martin Kraus, Fuerth (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 468 days.

(21) Appl. No.: 17/694,958

(22) Filed: Mar. 15, 2022

(65) Prior Publication Data

US 2022/0301289 A1    Sep. 22, 2022

(30) Foreign Application Priority Data

Mar. 18, 2021    (DE) .................. 10 2021 202 672.9

(51) Int. Cl.
G06V 10/774    (2022.01)
G06V 10/74    (2022.01)

(52) U.S. Cl.
CPC .......... *G06V 10/774* (2022.01); *G06V 10/761* (2022.01); *G06V 2201/03* (2022.01)

(58) Field of Classification Search
CPC . G06V 10/774; G06V 10/761; G06V 2201/03
See application file for complete search history.

(56) References Cited

U.S. PATENT DOCUMENTS

| 10,867,385 B2* | 12/2020 | Hibbard | ................ G06F 18/41 |
| 11,348,008 B2* | 5/2022 | Pauly | ..................... G06N 3/045 |
| 2017/0337682 A1* | 11/2017 | Liao | ..................... G06T 7/0012 |

(Continued)

FOREIGN PATENT DOCUMENTS

EP    3246875 A2    11/2017

OTHER PUBLICATIONS

Song, Guoli et al: "A review on medical image registration as an optimization problem"; Current Medical Imaging; 2017; 13. Jg., Nr. 3; pp. 274-283.;.

(Continued)

*Primary Examiner* — Md K Talukder
(74) *Attorney, Agent, or Firm* — Harness, Dickey & Pierce, P.L.C.

(57) ABSTRACT

A computer-implemented method includes receiving first medical image data, wherein the first medical image data is based on a first medical imaging of an examination object, receiving second medical image data, wherein the second medical image data is based on a second medical imaging of the examination object, wherein the first and the second medical imaging differ by at least one of an imaging modality or by an imaging protocol used, wherein the first and the second medical image data are registered with one another, determining synthetic image data by applying a trainable function to the first medical image data, determining a measure of similarity with a similarity function by comparison of the synthetic image data and the second medical image data, adjusting at least one parameter of the trainable function by optimization of the similarity function based on the measure of similarity, provision of the trainable function.

15 Claims, 5 Drawing Sheets

(56) References Cited

U.S. PATENT DOCUMENTS

2018/0174049 A1\* 6/2018 Pauly ............... G06N 3/045
2022/0301289 A1\* 9/2022 Kraus ............. G06V 10/761

OTHER PUBLICATIONS

Dong, Xue et al: "Automatic multiorgan segmentation in thorax CT images using U-net-GAN"; Medical physics; 2019, 46. Jg.; Nr. 5; pp. 2157-2168;.

Hong, Byung-Woo et al: "Adaptive regularization of some inverse problems in image analysis"; IEEE Transactions on Image Processing; 2019; 29. Jg., pp. 2507-2521.;.

\* cited by examiner

METHOD FOR PROVIDING A TRAINABLE FUNCTION FOR DETERMINATION OF SYNTHETIC IMAGE DATA

CROSS-REFERENCE TO RELATED APPLICATION(S)

The present application hereby claims priority under 35 U.S.C. § 119 to German patent application number DE 102021202672.9 filed Mar. 18, 2021, the entire contents of which are hereby incorporated herein by reference.

BACKGROUND

The acquisition of medical image data of an examination object, in particular of a patient, for example for creation of a diagnosis and/or for planning of a medical intervention and/or for monitoring a disease of the examination object etc. is known. The medical image data is typically based in this case on medical imaging, which is carried out with an imaging modality. An imaging modality can for example be an X-ray device, a computed tomography device, a magnetic resonance tomography device, an ultrasound device etc. As an alternative or in addition the medical imaging is based on an imaging protocol. In particular the imaging modality can be controlled with the imaging protocol. In other words the medical imaging is defined by the medical modality and/or by the imaging protocol used. Medical image data that was acquired with the same medical modality but with different imaging protocols can differ for example.

Frequently it is necessary, for the creation of a diagnosis and/or for the planning of a medical intervention and/or for the monitoring of a disease, to compare medical image data of an examination object. In this case it can be necessary in particular to compare medical image data that was acquired with different medical modalities and/or with different imaging protocols. In other words it can be necessary or helpful to compare first medical image data of the examination object that is based on a first medical imaging with second medical image data of the examination object that is based on a second medical imaging. The use of different medical modalities and/or different imaging protocols in particular enables use to be made of various advantages of the different medical modalities and/or imaging protocols. In this case a presentation of the examination object in the medical image data is dependent on the medical imaging.

SUMMARY

The comparison of first and second medical image data that is based on different medical imagings, because of the different presentations of the examination object, is typically limited. A new acquisition of the medical image data with an alternate medical modality and/or an alternate imaging protocol is generally not performed in order not to subject the examination object to an unnecessary dose during the new acquisition of the medical image data. Moreover a renewed acquisition of the medical image data increases cost and time.

It is thus of interest to transform medical image data to be compared into a comparable presentation of the examination object. Synthetic image data can in particular be determined from the first medical image data, in which the presentation of the examination object is able to be compared with the presentation of the examination object in the second medical image data. For an improved comparability it is in particular of interest to register the synthetic image data and the second medical image data.

Solving the two problems of registration and determination of synthetic image data separately is known. It is known for example that synthetic image data can be determined from unregistered first medical image data by a Cycle Generative Adversarial Network (acronym: CycleGAN). As an alternative synthetic image data of registered first medical image data can be determined with a Feed Forward Network for example. In this case the registration of the first medical image data with the second medical image data is typically carried out before the determination of the synthetic image data. In this case the first and second medical image data typically comprise different presentations of the examination object. For this reason in particular the registration of the first and second image data is only possible to a limited extent. A poor registration in this example can lead to unsuitable synthetic image data or to data only suitable to a limited extent.

At least one example embodiment provides a method that, for determination of synthetic image data, takes account of registration of the synthetic image data with second medical image data.

At least some example embodiment provide a method for providing a trainable function for determination of synthetic image data, by a use of the trainable function, by a system for providing of a trainable function for determination of synthetic image data, by a computer program product and by a computer-readable memory medium in accordance with the independent claims. Advantageous developments are given in the dependent claims and in the description that follows.

Ways in which at least some example embodiments are implemented will be described below both with regard to the claimed apparatuses and also with regard to the claimed method. Features, advantages or alternate forms of embodiment mentioned here are likewise to be transferred to the other claimed subject matter and vice versa. In other words the physical claims (which are directed to an apparatus for example) can also be developed with the features that are described or claimed in conjunction with the method. The corresponding functional features of the method are embodied in such cases by corresponding physical modules.

At least one example embodiment provides a computer-implemented method for providing a trainable function for determination of synthetic image data, comprising receiving first medical image data, the first medical image data being based on a first medical imaging of an examination object; receiving second medical image data, the second medical image data being based on a second medical imaging of the examination object, the first and the second medical imaging differ in at least one of the imaging modality used or in an imaging protocol used, the first and the second medical image data are registered with one another; determining the synthetic image data by applying the trainable function to the first medical image data; determining a measure of similarity with a similarity function by comparison of the synthetic image data and the second medical image data; adjusting at least one parameter of the trainable function by optimization of the similarity function based on the measure of similarity; and providing the trainable function.

In at least one example embodiment, at least one of the first or second medical imaging is at least one of a histopathology, an X-ray imaging, an angiography, a computed tomography, a magnetic resonance tomography, an ultrasound imaging, an electrocardiography, a positron emission tomography, a single photon emission computed tomography or an optical coherence tomography.

In at least one example embodiment, the determining the measure of similarity is based on an optimization method, and the optimization method comprises a maximization of the measure of similarity by at least one of a geometrical or photometric transformation of at least one of the synthetic image data or of the second medical image data.

In at least one example embodiment, the optimization method comprises determining at least one first part area of the synthetic image data; determining a plurality of second part areas of the second medical image data; determining a plurality of part measures of similarity between the at least one first part area and the plurality of second part areas; and determining the similarity function based on the plurality of part measures of similarity, wherein the similarity function is based on a comparison of the first part area of the synthetic image data and a selected second part area of the second medical image data, and the selected second part area corresponds to that area of the plurality of second part areas with the maximum part measure of similarity.

In at least one example embodiment, the at least one first part area and the plurality of second part areas have the same geometrical form.

In at least one example embodiment, the determining of the plurality of second part areas is based on a start part area, and the start part area is based on the registration of the first medical image data and the second medical image data.

In at least one example embodiment, the determining synthetic image data, the determining a measure of similarity and the adjusting at least one parameter of the trainable function are carried out iteratively, wherein in one iteration a start part area is based on the selected second part area of the previous iteration.

In at least one example embodiment, the start part area and each other second part area of the plurality of second part areas at least partly cover each other.

In at least one example embodiment, the method further includes receiving initial first medical image data; the initial first medical image data being based on the first medical imaging of the examination object; determining initial synthetic image data by applying the trainable function to the initial first medical image data; determining a first mapping function by registering the initial synthetic image data and the second medical image data; and determining the first medical image data by applying the first mapping function to the initial first medical image data.

In at least one example embodiment, the determining synthetic image data, the determining a measure of similarity and the adjusting at least one parameter of the trainable function are carried out iteratively, the computer-implemented method further comprising determining a second mapping function by registering the synthetic image data and the second medical image data; and determining the first medical image data for the following iteration by applying the second mapping function to the first medical image data.

In at least one example embodiment, the trainable function comprises a Generative Adversarial Network, the Generative Adversarial Network comprises a generator and a discriminator, and the generator advantageously comprises a U net.

In at least one example embodiment, the adjusting at least one parameter of the trainable function is based on an optimization of a target function, the target function comprises a similarity function, the measure of similarity depends on the similarity function, and a weighting of the similarity function in the target function is variable.

In at least one example embodiment, the determining synthetic image data, the determining a measure of similarity and the adjusting at least one parameter of the trainable function are carried out iteratively, and the weighting of the similarity function increases with the iterations.

In at least one example embodiment, the weighting of the similarity function is adjusted based on a quality of the registration of the synthetic image data and the second medical image data, wherein the weighting of the similarity function increases based on the quality of the registration of the synthetic image data and the second medical image data.

At least one example embodiment provides a computer-implemented use of the trainable function comprising determining the synthetic image data by applying the trainable function to the first medical image data; and providing the synthetic image data.

At least one example embodiment provides a training system for providing of a trainable function for determination of synthetic image data, the training system including an interface; and a computing device, the interface being configured to receive first medical image data, the first medical image data being based on a first medical imaging of an examination object, the interface being further configured to receive second medical image data, the second medical image data being based on a second medical imaging of the examination object, the first and the second medical imaging differ by at least one of an imaging modality used or by an imaging protocol used, the first and the second medical image data are registered with one another, the computing device being configured to determine synthetic image data by applying the trainable function to the first medical image data, the computing device being further configured to determine a measure of similarity with a similarity function by comparison of the synthetic image data and the second medical image data, the computing device being further configured to adjust at least one parameter of the trainable function by optimization of the similarity function based on the measure of similarity, and the interface being further configured to provide the trainable function.

At least one example embodiment provides a computer program product with a computer program, when executed by a training system, are configured to cause the training system to perform a method according to at least one example embodiment.

At least one example embodiment provides a computer-readable memory medium storing instructions, when executed by a training system, are configured to cause the training system to perform a method according to at least one example embodiment.

BRIEF DESCRIPTION OF THE DRAWINGS

The characteristics, features and advantages of example embodiments described above will become clearer and easier to understand in conjunction with the following figures and their descriptions. In this case the figures and descriptions are not intended to restrict example embodiments and its forms in any way.

In different figures the same components are provided with corresponding reference characters. As a rule the figures are not true-to-scale.

In the figures:

Figure 1:
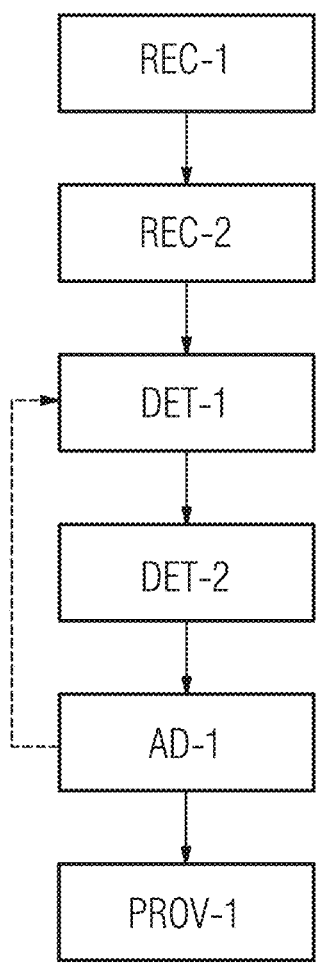
Figure 2:
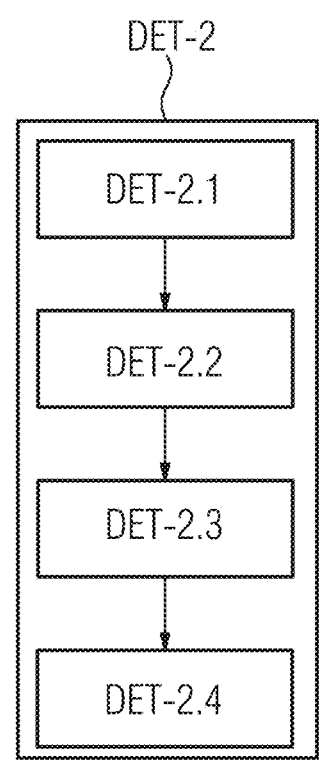
Figure 3:
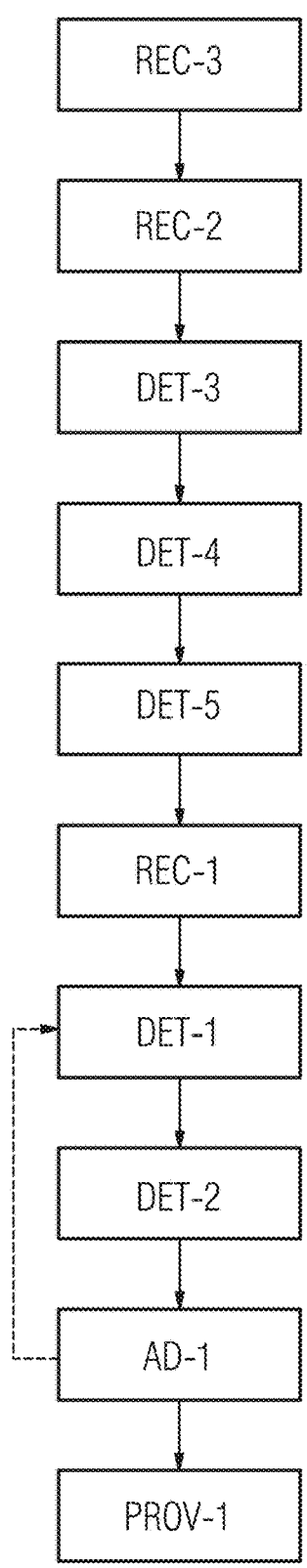
Figure 4:
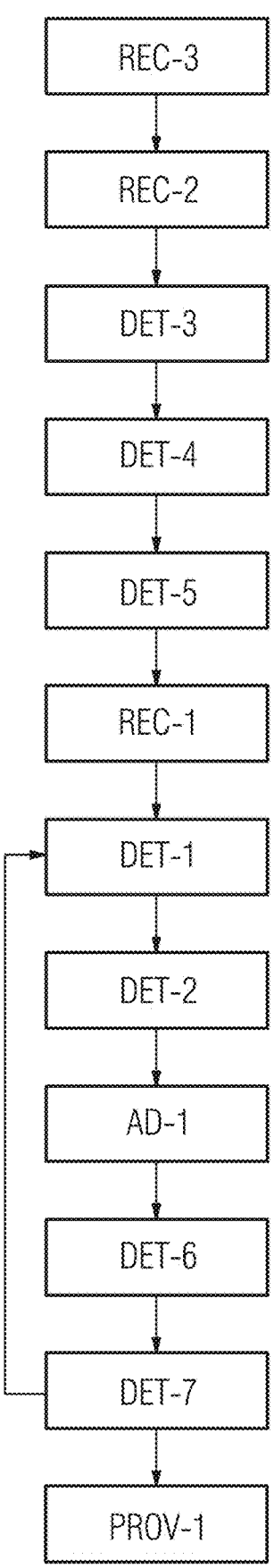
Figure 5:
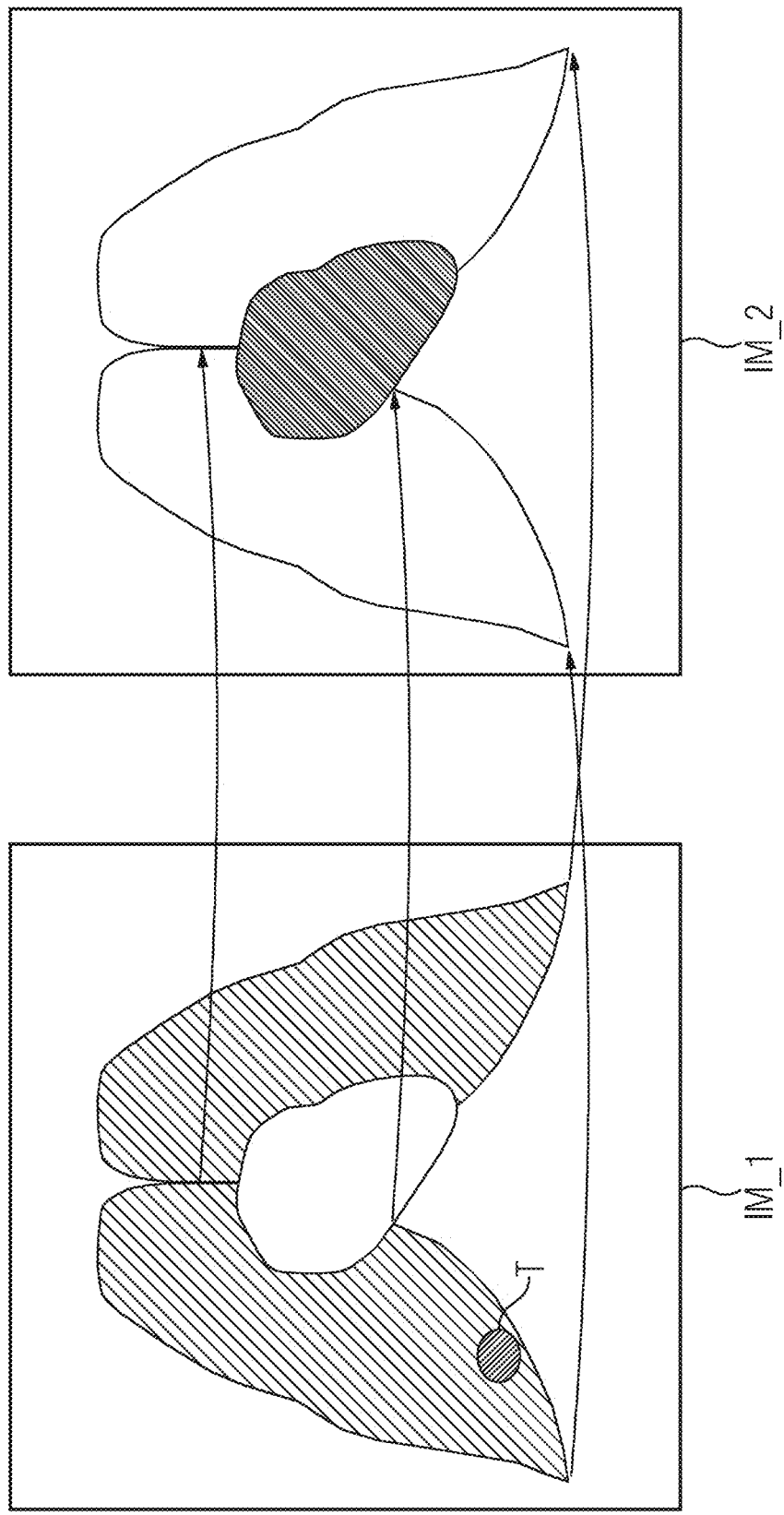
Figure 6:
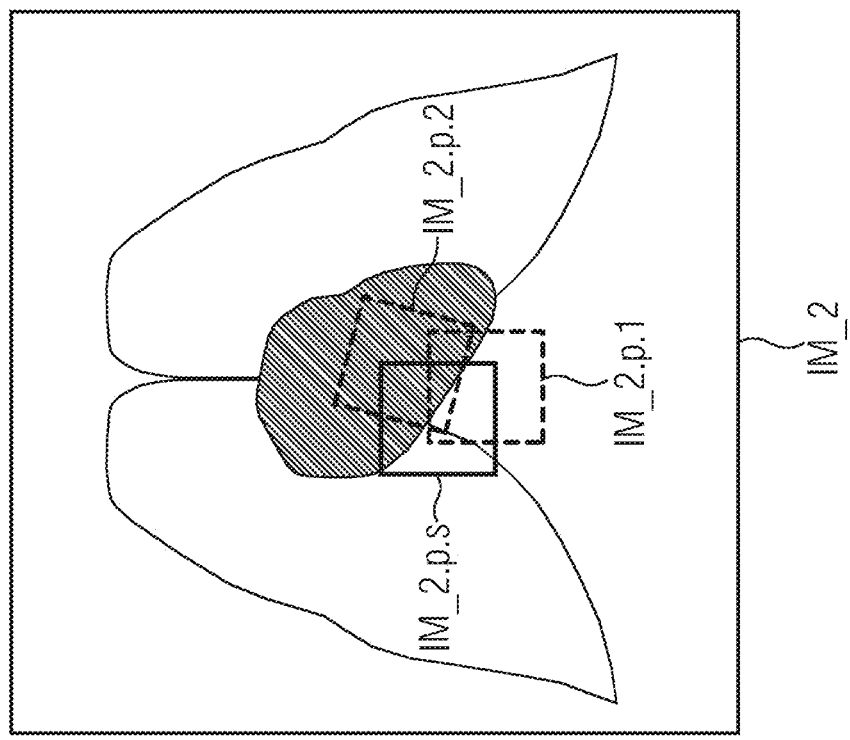
Figure 6:
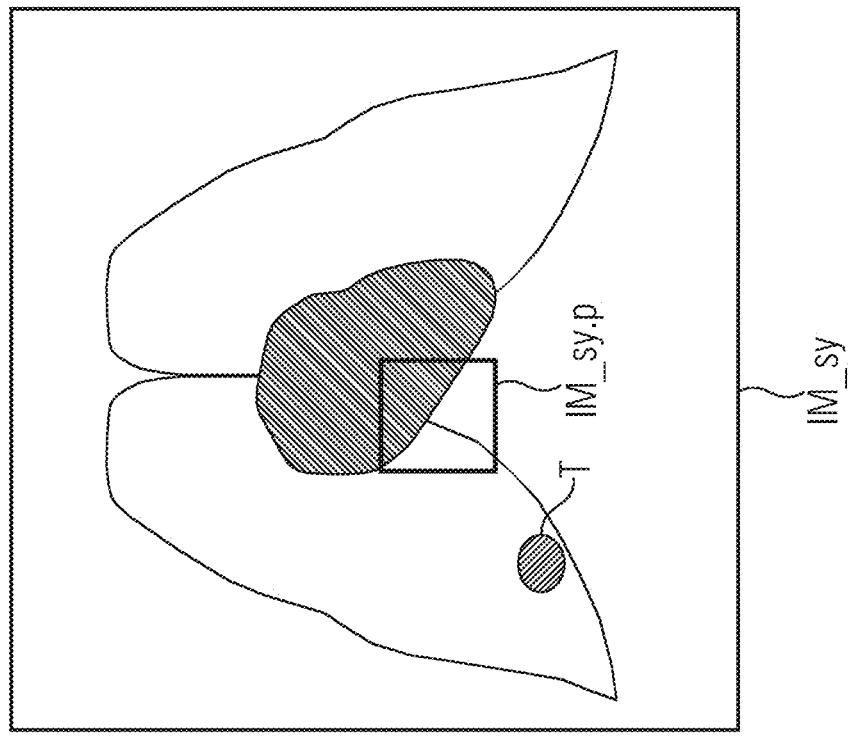
Figure 7:
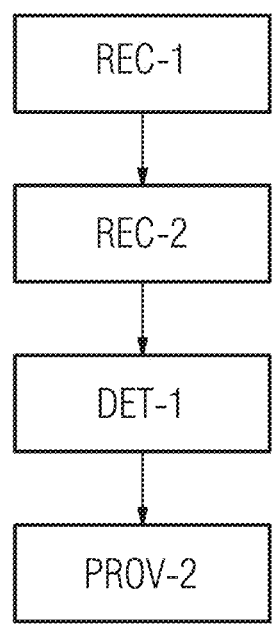
Figure 8:
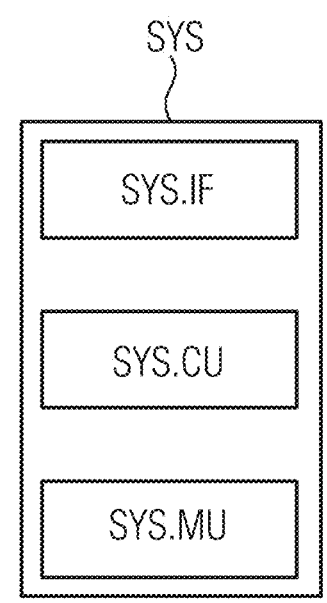

FIG. 1 shows a first exemplary embodiment of a method for providing a trainable function for determination of synthetic image data, FIG. 2 shows an exemplary embodiment of a method step of determining a measure of similarity, FIG. 3 shows a second exemplary embodiment of a method for providing a trainable function for determination of synthetic image data, FIG. 4 shows a third exemplary embodiment of a method for providing a trainable function for determination of synthetic image data, FIG. 5 shows an exemplary embodiment of registered first medical image data and second medical image data, FIG. 6 shows an exemplary embodiment of synthetic image data comprising a first part area and second medical image data comprising a plurality of second part areas, FIG. 7 shows an exemplary embodiment of a use of a trainable function provided, and FIG. 8 shows a training system for providing a trainable function for determination of synthetic image data.

DETAILED DESCRIPTION

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. At least one example embodiment, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

At least one example embodiment relates to a computer-implemented method for providing a trainable function for determination of synthetic image data. The method comprises a method step of receiving first medical image data. In this case the first medical image data is based on a first medical imaging of an examination object. The method further comprises a method step of receiving second medical image data. In this case the second medical image data is based on a second medical imaging of the examination object. In this case the first and the second medical imaging differ in a medical modality and/or in an imaging protocol used. In this case the first and the second medical image data are registered with one another. The method further comprises a method step of determining synthetic image data by application of the trainable function to the first medical image data. The method further comprises a method step of determining a measure of similarity with a similarity function by comparison of synthetic image data and the second medical image data. The method further comprises a method step of adjusting at least one parameter by optimizing the similarity function of the trainable function based on the measure of similarity. The method further comprises a method step of providing the trainable function.

In general a trainable function emulates cognitive functions, which connect humans with human thought. In particular, training based on training data enables the trainable function to be adjusted to new circumstances and to recognize and extrapolate patterns.

In general parameters of a trainable function can be adjusted by training. In particular, supervised training, semi-supervised training, unsupervised training, reinforcement learning and/or active learning can be used for this. What is more representation learning (an alternate term is feature learning) can be used. In particular the parameters of the trainable functions can be adjusted iteratively by a number of training steps.

A trainable function can in particular comprise a neural network, a support vector machine, a random tree or a decision tree and/or a Bayesian network, and/or the trainable function can be based on k-means clustering, Q-learning, genetic algorithms and/or association rules. A trainable function can in particular comprise a combination of a number of uncorrelated decision trees or an ensemble of decision trees (random forest). In particular the trainable function can be determined by XGBoosting (eXtreme Gradient Boosting). In particular a neural network can be a deep neural network), a convolutional neural network or a convolutional deep neural network. What is more a neural network can be an adversarial network, a deep adversarial network and/or a generative adversarial network. In particular a neural network can be a recurrent neural network. In particular a recurrent neural network can be a network with long short-term-memory, LSTM, in particular a Gated Recurrent Unit (GRU). In particular a trainable function can comprise a combination of the approaches described. In particular the approaches for a trainable function described here are referred to as the network architecture of the trainable function.

In the method step of receiving first medical image data the first medical image data is received. Similarly, in the method step of receiving second medical image data the second medical image data is received.

The first medical image data is based in this case on a first medical imaging of the examination object. Similarly, the second medical image data is based on a second medical imaging. In other words the first or second medical image data has been acquired by the first or second medical imaging. The first medical image data and the second medical image data in this case in particular comprise a presentation of the examination object. In particular the first and the second medical image data represent the same examination object. The examination object in this case can in particular be a person, for example a patient, an animal or an object. In particular the examination object can be a part of the person or the animal or the object. For example the examination object can be a knee, a thorax, a head, a heart etc. of the examination object.

The first or second medical image data can in particular comprise one-dimensional (1D), two-dimensional (2D), three-dimensional (3D) and/or four-dimensional (4D) medical image data.

1D medical image data can be data acquired for example with an electrocardiography system, a so-called electrocardiogram (acronym: EKG). In an EKG at least one image value is assigned within a period of time to one or more discrete points in time. In particular 1D medical image data can comprise a time vector comprising at least one point in time. In this case each point in time in the time vector is assigned one image value. In an EKG the image value can correspond to a potential acquired by the electrocardiography system at a corresponding point in time. Heart activity in particular can be represented in this way. In particular the examination object in this example is thus the heart. In particular the presentation of the examination object in this example is a time potential curve. In particular different 1D medical image data can be different derivations in electrocardiography. In particular the medical imaging for acquiring an EKG is an electrocardiography. In particular the medical modality for acquiring an EKG is the electrocardiography system. The different derivations then correspond to different imaging protocols.

2D medical image data can in particular be pixelated image data. In particular 2D medical image data can comprise a pixel matrix, wherein each pixel of the pixel matrix is assigned at least one image value. 2D medical image data can for example comprise a projection image or a slice image from the X-ray imaging. For X-ray imaging the medical modality corresponds to the X-ray system. In the imaging protocol in this case for example an X-ray voltage, a current strength, an illumination time etc. can be predetermined. As an alternative 2D medical image data can for example comprise image data from an ultrasound examination or a sonography. The medical modality in this case corresponds to the ultrasound system. The imaging protocol can for example in this case predetermine an ultrasound head used, a frequency and/or a type of data acquisition etc. The type of data acquisition specifies for example whether Doppler ultrasound is involved, and/or whether the data is acquired in an A mode or a B mode or an M mode. As an alternative 2D medical image data can for example comprise tissue slices from histopathology. In particular the tissue slices can be stained or unstained. The medical modality used in this case corresponds to an optical microscope.

3D medical image data can in particular be voxelated image data. In particular 3D medical image data can comprise a three-dimensional voxel matrix, wherein each voxel of the voxel matrix is assigned at least one image value. 3D medical image data can in particular comprise image data from a computed tomography examination and/or a magnetic resonance tomography examination and/or a positron emission tomography examination and/or a single photon emission computed tomography examination and/or a 3D ultrasound examination or 3D sonography. In other words, 3D medical image data represents the examination object in three spatial dimensions. The different imaging protocols can in particular predetermine parameters for recording or for acquisition of the medical image data with the respective medical modality.

4D medical image data can in particular comprise 3D medical image data with an additional time component. In other words 4D medical image data typically comprises time-resolved 3D medical image data or a chronological series of 3D medical image data. In particular 4D medical data comprises a time vector which comprises at least one point in time. In particular each point in time comprised by the time vector can be assigned a 3D medical image dataset.

The first and second medical image data differ from each other by the medical modality used in each case and/or by the imaging protocol used in each case. In other words the first and second medical image data differ in respect of the presentation of the examination object. The presentation depends on the medical modality used and/or on the imaging protocol used. The presentation is defined for example by mapping a material of the examination object in a value range of the image values. In other words the presentation describes a visual presentation of the examination object. As an alternative or in addition the presentation can be defined by intrinsic characteristics, for example a potential varying over time, of the examination object in a value range of the image values. In particular the presentation is characterized by the image values. In particular the first medical image data can comprise a presentation of unstained tissue slices and the second medical image data a presentation of the corresponding stained tissue slices. As an alternative the first medical image data can for example comprise a recording of the examination object by a computed tomography device and the second medical image data a recording of the examination object by a magnetic resonance tomography device. As an alternative the first medical image data can for example comprise data from a 4D computed tomography of a heart and the second medical image data an EKG of the heart. As an alternative the first medical image data can for example comprise a recording of the examination object from a magnetic resonance tomography with T1 weighting and the second medical image data a recording of the examination object from a magnetic resonance tomography with T2 weighting. In particular the first and second medical image data are interchangeable in the examples.

The first and second medical image data in this case are registered with one another. In particular the first and second medical image data in this case are in a defined spatial relationship with each other. In other words regions of the examination object corresponding to one another in the first and second image data can be assigned to one another. For example a pixel or voxel in the first medical image data corresponds to a pixel or voxel in the second medical image data. In particular the pixels or voxels corresponding to one another form the same region of the examination object. In particular more than one pixel or voxel can be registered in this way. As an alternative or in addition registered means that the first and second medical image data are registered with each other as regards time. For example a point in time in an EKG in each case in a computed tomography image can be assigned to a corresponding point in time from a 4D computed tomography of the heart.

In the method step for determining synthetic image data the synthetic image data is determined by applying the trainable function to the first medical image data. In this case the synthetic image data comprises a presentation of the examination object. In particular the presentation of the examination object in the synthetic image data can differ from the presentation in the first medical image data. In particular the presentation of the examination object in the synthetic image data can at least be similar to or be the same as the presentation of the examination object in the second medical image data. In other words the same materials can be represented or mapped by the same or by similar ranges of values of the image values in the second medical image data and the synthetic image data. In particular the presentation of the examination object in the synthetic image data depends on at least one parameter of the trainable function. In other words the presentation of the examination object in the synthetic image data can be predetermined with the at least one parameter of the trainable function. In particular the presentation of the examination object in the synthetic image data can depend on more than one parameter of the trainable function. The synthetic image data can in particular comprise one-dimensional (1D), two-dimensional (2D), three-dimensional (3D) and/or four-dimensional (4D) synthetic image data. The 1D, 2D, 3D and/or 4D synthetic image data can in particular be embodied as described above with regard to the 1D, 2D, 3D and/or 4D medical image data. Unlike the 1D, 2D, 3D and/or 4D medical image data, the 1D, 2D, 3D and/or 4D synthetic image data is determined from the first medical image data and not acquired based on a medical imaging.

In the method step of determining a measure of similarity, the measure of similarity is determined with the similarity function. The similarity function is based in this case on a comparison between the synthetic image data and the second medical image data. The measure of similarity can in particular depend on a sum of quadratic distances of the image values of the synthetic image data and the second medical image data. In other words the similarity function can describe a dependence of the measure of similarity on the sum of the quadratic distances. In particular in this case the respective distance between two image values corresponding to one another in the synthetic image data and the second medical image data is determined. Corresponding to one another means that the same region of the examination object is mapped in the corresponding pixels or voxels comprising the image values. In particular the distance between a respective image value of a pixel or voxel of the second medical image data and an image value of a pixel or voxel of the synthetic image data is determined. In this case the respective distance between the two pixels or voxels is determined, which in accordance with the registration correspond to one another or are assigned to one another. As an alternative corresponding means that the examination object is to be found in the same state in the synthetic image data and in the second medical image data in the points in time comprising the corresponding image values. The distance can correspond to a difference between the image values corresponding to one another in the synthetic image dataset and the second medical image dataset.

The image values $x(\omega)_i$ of the pixels or voxels or points in time of the synthetic image data can depend in particular on the at least one parameter $\omega$ of the trainable function. In other words a change in the at least one parameter leads to a change in the image values of the synthetic image data. The measure of similarity $\Delta(\omega)$ can for example be calculated as follows:

$$\Delta(\omega) = -\sum_i (x(\omega)_i - y_i)^2$$

In this case $x(\omega)_i$ are all pixels or voxels or points in time of the synthetic image data and $y_i$ are all pixels or voxels or points in time of the second medical image data. The index i runs in this case over all pixels or voxels or points in time, which are comprised by the synthetic image data or by the second medical image data. Two pixels or voxels or points in time with the same index correspond to each other in each case or are assigned to each other in accordance with the registration. Thus for example the pixel or voxel or point in time x1 in the synthetic image data corresponds to the pixel or voxel or point in time y1 in the second medical image data. In this case it is true to say that the smaller is the sum of the quadratic distances, the greater is the measure of similarity. In particular the measure of similarity can depend antiproportionally on the sum of the quadratic distances. As an alternative or in addition the measure of similarity can depend on a cross-correlation and/or a normalized cross-correlation and/or a covariance and/or a coefficient of correlation between the synthetic image data and the second medical image data. In particular it is true to say that the greater is the measure of similarity, the better the presentation of the examination object in the synthetic image data matches the presentation of the examination object in the second medical image data. In other words it is true to say that, the greater is the measure of similarity, the more similar is the synthetic image data and the second medical image data. In particular the measure of similarity depends on the at least one parameter of the trainable function.

In the method step of adjusting at least one parameter of the trainable function, the at least one parameter of the trainable function is adjusted by optimization of the similarity function based on the measure of similarity. In particular the at least one parameter is adjusted in such a way that the measure of similarity is increased, in particular maximized. In particular the synthetic image data, in particular the image values of the synthetic image data, can be varied or adjusted through adjustment of the at least one parameter in such a way that the measure of similarity between the second medical image data and the synthetic image data determined by application of the adjusted trainable function is enlarged, in particular maximized. The measure of similarity is in particular maximized by the optimization of the similarity function.

In particular the method steps of determining synthetic image data, determining the measure of similarity and adjusting the at least one parameter are carried out iteratively. In each iteration step in particular the trainable function is optimized by adjustment of the at least one parameter. In the subsequent iteration the synthetic image data is determined by application of the optimized trainable function. Subsequently the measure of similarity between the synthetic image data determined in this way and the second medical image data is again determined. Based on this measure of similarity the at least one parameter of the trainable function is adjusted once again. In this case the trainable function is again optimized in such a way that the synthetic image data more strongly resembles the second medical image data, in that the measure of similarity is increased or maximized.

In the method step of providing the trainable function, the function able to be trained in the way described above is provided. In particular the trainable function is provided for determining synthetic image data. In particular the trainable function can be provided for a use. In particular the trainable function can be provided for a use by any given computing unit.

The inventor has recognized that it is possible to adjust the at least one parameter of the trainable function based on the measure of similarity when the first medical image data and the second medical image data are registered with one another. In particular the inventor has recognized that the synthetic image data and the second medical image data are then also registered with one another.

According to at least one example embodiment the first and/or second medical imaging is a histopathology, an X-ray imaging, an angiography, a computed tomography (acronym: CT), a magnetic resonance tomography (acronym: MRT), an ultrasound imaging, an electrocardiography, a positron emission tomography (acronym: PET), a single photon emission computed tomography (acronym: SPECT) and/or an optical coherence tomography (acronym: OCT).

In particular the first and/or second medical image data can be based on one of the above types of imaging. In particular the first and/or second medical image data can be acquired by one of the above types of imaging. In particular the first medical image data is based on an, in particular preoperative, angiography. In particular the second medical image data can be based on an, in particular inter-operative, OCT. As an alternative the first medical image data can be based on ultrasound imaging. In particular the second medical image data can then be based on a CT or MRT. As an alternative the first medical image data can be based on a CT. In particular the second medical image data can then be based on an MRT. As an alternative the first medical image data can be based on a histopathology of unstained vessel slices. In particular the second medical image data can then be based on a histopathology of stained vessel slices. In particular the first and second medical image data is interchangeable in the examples given above.

The inventor has recognized that determining synthetic image data for a plurality of medical imagings is possible.

According to at least one example embodiment the method step of determining the measure of similarity is based on an optimization method. In this case the optimization method comprises a maximization of the measure of similarity by a geometrical and/or photometric transformation of the synthetic image data and/or the second medical image data.

In particular in the optimization method the synthetic and/or the second medical image data are transformed in such a way that the measure of similarity is maximized. The transformation is based in this case a geometrical and/or photometric transformation of the synthetic image data and/or the second medical image data.

In the geometrical transformation the synthetic and/or second medical image data are translated and/or rotated and or scaled and/or reflected and/or sheared in such a way that the measure of similarity is maximized. In particular the synthetic and/or second medical image data can be transformed by an affine transformation. In particular a geometrical transformation of a time vector can be described by a shifting or a translation of the time vector in discrete time steps.

In photometric transformation a brightness and/or a contrast in the synthetic and/or second medical image data in particular can be varied. In other words the image values of the synthetic and/or second medical image data can be varied. In particular in this case a dependency between individual image values is taken into account. A dependency can for example be that specific pixels or voxels represent the same material. In particular the image value of these pixels or voxels can then be adapted accordingly to one another.

In the optimization method a part area of the synthetic image data and/or second medical image data can in particular be transformed as described above. In particular the part area can comprise a subset of the pixels or voxels or points in time. In particular the pixels or voxels or points in time of the part area can be spatially and/or temporally contiguous.

The inventor has recognized that, with the aid of the optimization method, an actual similarity between the synthetic image data and the second medical image data in the form of the measure of similarity can be determined. The inventor has recognized that in this way it can be excluded that, for example on account of a shift of the synthetic and the second medical image data in relation to each other and/or on account of a difference in illumination, the image data is incorrectly grouped together as not similar and the at least one parameter is incorrectly adjusted. The inventor has recognized that the adjustment of the at least one parameter by the optimization method, which can also be referred as fine registration, is possible in a more targeted way.

According to at least one example embodiment the optimization method comprises a method step of determining at least one first part area of the synthetic image data. The optimization method further comprises a method step of determining a plurality of second part areas of the second medical image data. The optimization method further comprises a method step of determining a plurality of part measures of similarity between the at least one first part area and the plurality of second part areas. The optimization method further comprises a method step of determining the similarity function based on the plurality of part measures of similarity. In this case the similarity function is based on a comparison of the first part area of the synthetic image data and a selected second part area of the second medical image data. In this case the selected second part area corresponds to that part area of the second part areas with the maximum part measure of similarity.

In the method step of determining at least one first part area, at least one first part area of the synthetic image data is determined. The at least one first part area in this case can in particular comprise a part of the pixel matrix or voxel matrix or of the time vector of the synthetic image data. In particular the pixels or voxels or points in time comprised by the at least one first part area can be temporally and/or spatially coherent. Spatially coherent means that the corresponding pixels or voxels lie spatially next to one another in the pixel matrix or in the voxel matrix. Temporally coherent means that the points in time in the time vector follow one another. The at least one first part area comprises at least one pixel or at least one voxel or at least one point in time. In particular the at least one first part area can comprise 4×4 pixels or 8×8 pixels or 16×16 pixels. In particular the at least one first part area can comprise at least 4×4×4 voxels or 8×8×8 voxels or 16×16×16 Voxels. In particular the at least one first part area can comprises at least 4 points in time or 8 points in time or 16 points in time.

In particular a plurality of first part areas can be determined. The plurality of first part areas can in this case be embodied in such a way that each pixel or voxel or point in time of the pixel matrix or the voxel matrix or the time vector is included by the at least one first part area.

In the method step of determining a plurality of second part areas the plurality of second part areas of the second medical data are determined. A second part area can be embodied in a similar way to the at least one first part area described above. In particular the second part areas of the plurality of second part areas are different in pairs. In particular a second part area comprises a part of the pixel matrix or the voxel matrix or the time vector of the second medical image data. The plurality of the second part areas can be embodied in such a way that at least a second part area is arranged in an area in the second medical image data corresponding to the at least one first part area. In other words at least one second part area can map at least partly the same part of the examination object as the first at least one first part area. The corresponding part areas can be based in this case on the registration of the first and second medical image data.

In the method step of determining a plurality of part measures of similarity the plurality of part measures of similarity between the at least one first part area and the plurality of second part areas are determined. A part measure of similarity in this case can be embodied like the measure of similarity described above. In particular a part measure of similarity can be determined between each second part area of the plurality of second part areas and the at least one first part area. In this case a part measure of similarity describes a similarity between a second part area and the at least one first part area.

In the method step of determining the similarity function the similarity function is determined based on the plurality of part measures of similarity. In this case the similarity function is embodied as described above. In this case the similarity function is based on a comparison of the first part area of the synthetic image data and a selected second part area of the second medical image data. In other words the similarity function in this case is restricted to a comparison of the first part area and the selected second part area. In particular the first part area depends on the at least one parameter of the trainable function. In other words the presentation of the examination object in the first part area depends on the at least one parameter. In other words the image values of the first part area depend on the at least one parameter. Thus the similarity function also depends on the at least one parameter of the trainable function. The result of the similarity function in this case corresponds to the measure of similarity.

The measure of similarity can for example, as described above, be determined as the negative sum of the quadratic distances of the image values of the synthetic image data and the second medical image data. In these examples the index j runs over all pixels or voxels or points in time of the first part area and of the selected second part area. The image values $x(\omega)_j$ of the pixels or voxels or points in time of the first part area of the synthetic image data depend on the at least one parameter co of the trainable function ab. In other words a change in the at least one parameter leads to a change in the image values of the first part area. In this way the similarity function $\Delta(\omega)$ can be expressed as follows:

$$\Delta(\omega) = -\sum_j (x(\omega)_j - y_j)^2$$

The selected second part area corresponds to that second part area of the plurality of second part areas with the maximum part measure of similarity. In other words the selected second part area corresponds to that second part area of the plurality of second part areas that is most similar to the at least one first part area. In the selection of the selected second part area the at least one parameter is not changed. In other words first of all the second part area of the plurality of second part areas is selected or determined, for which the part measure of similarity is at its maximum with an unchanged at least one parameter of the trainable function. The part measure of similarity can be determined in a similar way to the measure of similarity. The maximum part measure of similarity corresponds in this case to the measure of similarity. The adjustment of the at least one parameter is based, as described above, on the similarity function. In particular the at least one parameter is varied in such a way that the measure of similarity is maximized as a result of the similarity function. In other words the similarity function can be optimized based on the measure of similarity. In other words, by adjusting the at least one parameter, the similarity of the at least one first part area and the selected second part area can be maximized. In this case in particular the selection of the at least one first part area and the selected second part area is not changed. In other words, based on the second part area, for which the maximum part measure of similarity for a fixed value of the at least one parameter was determined, the measure of similarity can now be optimized or maximized by varying or adjusting the value of the at least one parameter. In particular by the adjustment of the at least one parameter the similarity between the synthetic image data and the second medical image data can then be maximized.

The inventor has recognized that by the optimization method an optimized measure of similarity can be determined. In particular it is possible to prevent the similarity function being optimized on the basis of a measure of similarity that is based on an incorrect spatial and/or temporal assignment of the synthetic and second medical image data. The inventor has recognized that the optimization method can be realized with a fine registration. The inventor has recognized that the training or the optimization or the adjustment of the trainable function can be optimized or improved by the fine registration. The inventor has recognized that, through the subdivision of the synthetic image data and the second medical image data into part areas, a distortion and/or a non-affine transformation between the synthetic image data and the second medical image data can be compensated for.

According to at least one example embodiment the at least one first part area and the plurality of second part areas can have the same geometrical form.

In particular the at least one first part area and each second part area of the plurality of second part areas comprise the same number of pixels or voxels or points in time. In particular the pixels or voxels or points in time in the at least one first part area and each second part area can have the same arrangement. In particular the arrangement describes the geometrical form. In particular the geometrical form in a pixel matrix or voxel matrix can correspond to a spatial arrangement or form. In particular the geometrical form can then for example correspond to a parallelogram in the pixel matrix. The parallelogram can be embodied in particular in the form of a rectangle, in particular in the form of a square. In particular the geometrical form in a voxel matrix for example can correspond to a parallelepiped, in particular a cuboid, in particular a cube. In a time vector the geometrical form can in particular correspond to a temporal arrangement of points in time. The points in time can in particular be arranged in a consecutive order.

The inventor has recognized that, to determine the plurality of part measures of similarity, the at least one first part area and the plurality of second part areas advantageously have the same geometrical form. The inventor has recognized that the corresponding part measure of similarity represents the similarity of the two part areas especially well. In particular in this way each image value of each pixel or voxel or point in time in the first part area can be compared with an image value of a pixel or voxel or point in time in a second part area.

According to at least one example embodiment the determining of the plurality of second part areas is based on a start part area. In this case the start part area is based on the registration of the first medical image data and the second medical image data.

In other words the plurality of second part areas at least comprises the part area of the second medical image data that corresponds to the at least one first part area in accordance with the registration of the first medical image data and the second medical image data. In particular each pixel or voxel or point in time in the first medical image data is assigned a pixel or voxel or point in time in the second medical image data in the registration. In particular each pixel or voxel or point in time in the synthetic image data can be assigned a pixel or voxel or point in time in the first medical image data. In other words a one-to-one correspondence exists between the pixels or voxels or points in time of the synthetic image data and the first medical image data. Thus each pixel or voxel or point in time in the synthetic image data can also be assigned a corresponding pixel or voxel or point in time in the second medical image data. In other words the synthetic image data and the second medical image data are also then registered with one another. In this case the assignment of the pixels or voxels or points in time in the synthetic image data and the second medical image data is then based on the registration of the first and second medical image data. In particular the at least one first part area and the start part area in accordance with the registration can thus comprise pixels or voxels or points in time assigned to one another.

In particular the other second part areas of the plurality of second part areas can be determined starting from the start part area. For example at least one other second part area can at least partly adjoin the start part area spatially and/or temporally and/or overlap with the start part area spatially and/or temporally.

The inventor has recognized that in this way the at least one first part area and the plurality of second part areas being arranged in areas or parts of the synthetic and the second medical image data not dependent on one another can be avoided. The inventor has recognized that a part measure of similarity between two independent areas in the synthetic image data and in the second medical image data is not meaningful. The inventor has moreover recognized that in this way the number of the second part areas can be minimized, since it is ensured that the plurality of second part areas is arranged in an area of the second medical data around the start part area that corresponds to the at least one first part area at least partly.

According to at least one example embodiment the method steps of determining synthetic image data, determining a measure of similarity and adjusting at least one parameter of the trainable function are carried out iteratively. In this case a start part area in an iteration is based on the selected part area of the previous iteration.

In the iterative carrying out of the said method steps, in a first iteration the at least one parameter of the trainable function is adjusted. In the following iteration the synthetic image data is determined by applying the trainable function with the at least one adjusted parameter to the first medical image data. The measure of similarity is determined in the following method step of determining the measure of similarity as described above based on the newly determined synthetic image data. Based on this measure of similarity the at least one parameter of the trainable function is adjusted once again in the method step of adjusting the at least one parameter. In particular these method steps are repeated until an abort criterion is reached. In particular the iterative carrying out of these method steps can be referred to as training the trainable function. Carrying out the at least three method steps is referred to as iteration. The abort criterion can for example predetermine a maximum number of Iterations. As an alternative or in addition the abort criterion can predetermine a value for the measure of similarity at which the training of the trainable function is to be ended.

In particular the start part area can be defined in a similar way to the start part area described above. In particular the start part area can be based on the selected second part area, for which, in the preceding or previous iteration, the maximum measure of similarity was determined. In other words the start part area can correspond to the selected second part area of the previous iteration. In other words the start part area can comprise the pixels or voxels or points in time, which were also comprised by the selected second part area of the previous iteration.

In particular the other second part areas of the plurality of second part areas can be determined depending on the start part area.

The inventor has recognized that the optimization method can be speeded up when the second part area selected in accordance with the optimization method of the previous iteration is selected as the start part area. In particular the inventor has recognized that it can be ensured in this way that the second part area with the maximum measure of similarity to the at least one first part area from the previous iteration is part of the plurality of second part areas.

According to at least one example embodiment the start part area and each other second part area of the plurality of second part areas cover each other at least partly.

In other words each second part area of the plurality of second part areas comprises at least one pixel or voxel or point in time, which is also comprised by the start part area and/or at least one other second part area. In particular the second part areas can be determined by a geometrical transformation from the start part area. The geometrical transformation can in particular be embodied as above. In particular the geometrical transformation can comprise a translation and/or a rotation. In other words a second part area of the plurality of second part areas can comprise those pixels or voxels or points in time that are enclosed by a frame that describes the start part area after a geometrical transformation of the frame. In its initial position the frame encloses the start part area. The geometrical transformation can in particular be carried out spatially and/or temporally.

The inventor has recognized that the probability of the second part area, for which the maximum part measure of similarity is determined, being arranged in the vicinity of the start part area is especially great. The inventor has recognized that the second part area with the maximum part measure of similarity can be determined by a geometrical transformation from the start part area. In particular in this way a slight shift and/or rotation and/or distortion etc. of the synthetic image data relative to the second medical image data can be corrected. In particular in this way an influence that is based solely on a geometrical transformation can be minimized to the at least one parameter of the trainable function.

According to at least one example embodiment the method furthermore comprises a method step of receiving initial first medical image data. In this case the initial first medical image data is based on the first medical imaging of the examination object. The method further comprises a method step of determining initial synthetic image data by applying the trainable function to the initial first medical image data. The method further comprises a method step of determining a first mapping function by registration of the initial synthetic image data and the second medical image data. The method further comprises a method step of determining the first medical image data by applying the first mapping function to the initial first medical image data.

In the method step of receiving the initial first medical image data initial first medical image data is received, which is based on the first medical imaging of the examination object. The initial first medical image data is in particular embodied similarly to the first medical image data. The initial first medical image data is in particular not registered with the second medical image data.

In the method step of determining initial synthetic image data the initial synthetic image data is determined by applying the trainable function to the initial first medical image data. The trainable function can in particular be pretrained. In particular the presentation of the examination object in the initial synthetic image data corresponds to the presentation of the examination object in the second medical image data. In other words the presentation of the examination object in the initial synthetic image data and in the second medical image data is at least similar or is the same. In particular in the initial synthetic image data and in the second medical image data a characteristic of the examination object by image values in a comparable or same range of values is shown.

In the method step of determining a first mapping function the first mapping function is determined by registering the initial synthetic image data and the second medical image data. In particular the initial synthetic image data can be mapped by the first mapping function to the second medical image data. In other words the initial synthetic image data can be mapped or registered to the second medical image data by applying the first mapping function to the initial synthetic image data. In particular, regions of the examination object corresponding to one another in the initial synthetic image data and in the second medical image data can be mapped to one another. In particular, individual landmarks in the initial synthetic image data can be mapped by the first mapping function to the corresponding landmarks in the second medical image data. In particular, individual pixels or voxels or points in time in the initial synthetic image data can be mapped to individual pixels or voxels or points in time in the second medical image data. Landmarks can in particular be anatomical features. For example a position of a bone can be a landmark. As an alternative a landmark in an EKG can be an R peak for example. The first mapping function describes in particular a geometrical transformation of the initial synthetic image data in such a way that the initial synthetic image data will be mapped to the second medical image data.

In the method step of determining the first medical image data the first medical image data is determined by applying the first mapping function to the initial first medical image data. In particular the first medical image data is then registered with the second medical image data. In other words the initial first medical image data is registered with the second medical image data by applying the first mapping function.

The inventor has recognized that a registration is advantageously carried out for image data with an at least similar or corresponding presentation of the examination object. The inventor has thus recognized that advantageously the initial synthetic image data and the second medical image data can be used for registering or determining a first mapping function. The inventor has recognized that the first mapping function can be applied to the initial first medical image data. In particular the inventor has recognized that the initial first medical image data can be registered in this way with the second medical image data. In particular the inventor has recognized that the first medical image data can be determined in this way, which can be used in accordance with the method described above for training the trainable function.

According to at least one example embodiment the method steps of determining synthetic image data, of determining a measure of similarity and of adjusting at least one parameter of the trainable function are carried out iteratively. The method further comprises an iterative method step of determining a second mapping function by registering the synthetic image data and the second medical image data. The method further comprises an iterative method step of determining the first medical image data for the following iteration by applying the second mapping function to the first medical image data.

In particular the method steps of determining synthetic image data, of determining a measure of similarity and of adjusting at least one parameter of the trainable function are carried out iteratively, as described above.

In the method step of determining a second mapping function, in each iteration the second mapping function is determined by registering the synthetic image data and the second medical image data. The registration can be carried out as described above for the initial synthetic image data and the second medical image data. By applying the second mapping function the synthetic image data can be mapped or registered to the second medical image data. In particular, landmarks in the synthetic image data can be mapped to corresponding landmarks in the second medical image data. In particular, individual pixels or voxels or points in time in the synthetic image data can be mapped to individual pixels or voxels or points in time in the second medical image data.

In the method step of determining the first medical image data for the following iteration the first medical image data for the following iteration is determined in each iteration by applying the second mapping function to the first medical image data. In other words, at the end of each iteration, the first medical image data is determined for the next or following iteration. For this the second mapping function is applied to the current first medical image data. In this case the first medical image data is mapped to the second medical image data or is registered with said data. In particular, landmarks in the first medical image data can be mapped to corresponding landmarks in the second medical image data. In particular, individual pixels or voxels or points in time in the first medical image data can be mapped to individual pixels or voxels or points in time in the second medical image data. In particular the first medical image data, to which the second mapping function was applied, and the second medical image data are then registered. In particular, in each iteration, the registration of the first and second medical image data can be improved in this way.

The inventor has recognized that by a continuous improvement of the registration of the first and second medical image data the determination of the synthetic image data can also be improved. In particular the training of the trainable function can be speeded up in this way. In other words the inventor has recognized that the at least one parameter can be adjusted more effectively when the first and second medical image data are registered as well as possible. On the other hand a registration that is as good as possible is in particular possible when the synthetic image data and the second medical image data is as similar as possible. The inventor has recognized that a self-reinforcing effect is produced by this, which can be used for training the trainable function.

According to at least one example embodiment the trainable function comprises a Generative Adversarial Network. In this case the Generative Adversarial Network comprises a generator and a discriminator. In this case the generator advantageously comprises a U net.

In the Generative Adversarial Network (acronym: GAN) the generator is embodied to create the synthetic image data from the first medical image data. The discriminator is embodied to evaluate the created synthetic data.

The U net, also called a Dense Unit Network, comprises in particular a Convolutional Neural Network. A U net typically comprises a plurality of layers. These layers can be divided into two sections. In other words each layer can be assigned one of the two sections. In this case the first half of the layers is assigned to the first section and the second half of the layers to the second section. In the first section the input data, here the first medical image data, is reduced in its dimension (downsampling). The dimension of the first medical image data is for example given by a size of the pixel matrix or the voxel matrix or the time vector. In other words the dimension of the first medical image data is given by a number of pixels or voxels or points in time comprised by the first medical image data. In the second section of the U net the dimension is increased again in such a way that the dimension of the output data corresponds to the dimension of the input data. In this case the output data corresponds to the synthetic image data. The layers of the two sections are in particular connected to one another. For example the first layer is connected to the last layer, the second layer is connected to the second-to-last layer etc. In other words the last layer receives information from the first layer, the second-to-last layer receives information from the second layer etc.

The inventor has recognized that a U net integrated into a GAN is suitable for creating or determining the synthetic image data from the first medical image data. The inventor has moreover recognized that the determination of the synthetic image data and the assessment of the synthetic image data can be combined in a GAN.

According to at least one example embodiment the method step of adjusting at least one parameter of the trainable function is based on an optimization of a target function. In this case the target function comprises a similarity function. In this case the measure of similarity depends on the similarity function. In this case a weighting of the similarity function in the target function is variable.

The similarity function can in particular correspond to the similarity function described above. In particular the similarity function depends on the at least one parameter. In particular the result of the similarity function can correspond to the measure of similarity. In particular the similarity function is part of the target function. In particular the target function thus depends on the at least one parameter. In particular the measure of similarity can be maximized by an optimization of the similarity function and thus also of the target function. In particular the target function can depend on further characteristics of the synthetic image data, for example on a smoothness and/or on an absolute variance of the image values and/or on a noise of the image values etc. of the synthetic image data. In particular the smoothness can be maximized and/or the absolute variance minimized and/or the noise minimized by the optimization of the target function. As an alternative or in addition the target function can depend on a cycle loss when the GAN is embodied as a Cycle GAN. As an alternative or in addition the target function can depend on a batch normalization. In particular the training of the trainable function comprises an optimization of the target function.

In particular an influence of the similarity function on the target function can be predetermined by the weighting of the similarity function. In other words the weighting of the similarity function can predetermine the influence of the similarity function relative to other factors of the target function. In particular the weighting of the similarity function can be embodied as variable. In particular the weighting can be adapted to an external circumstance, for example a quality of the synthetic image data and/or a duration of the training.

The inventor has recognized that through the variability of the weighting of the similarity function there can be a flexible reaction to external circumstances. In particular the training of trainable function can be adapted to the external circumstances.

According to at least one example embodiment the method steps of determining synthetic image data, of determining a measure of similarity and of adjusting at least one parameter of the trainable function are carried out iteratively. In this case the weighting of the similarity function increases with the iterations.

The iterations are in particular carried out as described above. In particular each iteration can moreover comprise the method steps of determining a second mapping function and of determining the first medical image data for the following iteration.

In particular the training refers to carrying out the totality of the iterations.

In particular the weighting of the similarity function in the target function can increase with the number of iterations. In other words the similarity function can be weighted more heavily in the target function the more iterations have already been carried out. In other words the influence of the similarity function on the target function can increase during the training. In particular it can be defined in advance at which iteration the weighting should assume a particular value.

The inventor has recognized that the similarity of the synthetic image data with the first medical image data plays an ever greater role, the better or longer the trainable function has already been trained. The inventor has recognized that this can be taken into account by an adjustment or variation of the weighting.

According to at least one example embodiment the weighting of the similarity function is adjusted depending on a quality of the registration of the synthetic image data and of the second medical image data. In this case the weighting of the similarity function increases for an increase in the quality.

In particular the quality of the registration specifies how well the synthetic image data and the first medical image data can be registered. In other words the quality specifies a quality of the registration. In particular it is true to say that the greater is the quality the better is the registration.

The quality in this case can in particular be based on a measure of similarity or depend on a measure of similarity. In other words the quality can be defined by the measure of similarity. The measure of similarity can be embodied in this case as described above.

In particular at least one threshold value for the quality can be defined. In particular the weighting of the similarity function can be adjusted if the threshold value is exceeded. In particular the weighting of the similarity function can increase with the quality of the registration. In other words the influence of the similarity function in the target function can increase the better the quality of the registration between the synthetic image data and the first medical image data is.

The inventor has recognized that the measure of similarity gains in meaningfulness with the increasing quality of the registration. In particular the inventor has recognized that this can be taken into account by an increase in the weighting of the similarity function in the target function. The inventor has recognized that this can be taken into account in adjusting the at least one parameter and thus in training the trainable function through an adjustment of the weighting of the similarity function.

At least one example embodiment moreover relates to a computer-implemented use of a trainable function described above. The use of the trainable function comprises a method step of receiving first medical image data. In this case the first medical image data is based on a first medical imaging of an examination object. The use of the trainable function further comprises a method step of receiving second medical image data. In this case the second medical image data is based on a second medical imaging of the examination object. In this case the first medical imaging and the second medical imaging differ by a modality used and/or by an imaging protocol used. In this case the first and second medical image data are registered with one another. The use of the trainable function further comprises a method step of determining synthetic image data by applying the trainable function to the first medical data. The use of the trainable function furthermore comprises a provision of the synthetic image data.

At least one example embodiment moreover relates to a training system for providing a trainable function for determination of synthetic image data. The training system comprises an interface and a computing unit. In this case the interface is embodied for receiving first medical image data. In this case the first medical image data is based on a first medical imaging of an examination object. In this case the interface is furthermore embodied to receive second medical image data. In this case the second medical image data is based on a second medical imaging of the examination object. In this case the first medical imaging and the second medical imaging differ by an imaging modality used and/or by an imaging protocol used. In this case the first and second medical image are registered with one another. In this case the computing unit is embodied to determine synthetic image data by applying the trainable function to the first medical image data. In this case the computing unit is furthermore embodied to determine a measure of similarity with a similarity function by comparison of the synthetic image data and the second medical image data. In this case the computing unit is furthermore embodied to adjust the at least one parameter of the trainable function by optimization of the similarity function based on the measure of similarity. In this case the interface is furthermore embodied for providing the trainable function.

Such a training system can in particular be embodied to carry out the method previously described for providing a trainable function for determination of synthetic image data and its aspects. The training system is embodied to carry out this method and its aspects, by the interface and the computing unit being embodied to carry out the corresponding method steps.

At least one example embodiment also relates to a computer program product with a computer program as well as a computer-readable medium. A realization of the product largely in software has the advantage that even training systems previously used can be easily upgraded by a software update, in order to work in the way described. Such a computer program product, as well as the computer program, might possibly comprise additional elements such as e.g. documentation and/or additional components, as well as hardware components, such as e.g. hardware keys (dongles etc.) for using the software.

In particular at least one example embodiment also relates to a computer program product with a computer program, which is able to be loaded directly into a memory of a training system, with program sections for carrying out all steps of the method described above for providing a trainable function for determination of synthetic image data and its aspects when the program sections are executed by the training system.

In particular at least one example embodiment relates to a computer-readable memory medium, on which program sections able to be read and executed by a determination system and/or a training system are stored, for carrying out all steps of the method described above for providing a trainable function for determination of synthetic image data and its aspects when the program sections are executed by the training system.

FIG. 1 shows a first exemplary embodiment of a method for providing a trainable function for determination of synthetic image data IM_sy.

In a method step of receiving REC-1 first medical image data IM_1, the first medical image data IM_1 is received by an interface SYS.IF.

In a method step of receiving REC-2 second medical image data IM_2, second medical image data IM_2 is received, in particular the interface SYS.IF.

In this case the method steps of receiving REC-1 the first medical image data IM_1 and of receiving REC-2 the second medical image data IM_2 can also be carried out at the same time or in the reverse order.

In this case the first medical image data IM_1 is based on a first medical imaging of an examination object. Similarly the second medical image data IM_2 is based on a second medical imaging of the examination object. In this case the first and the second medical imaging are different. The first and the second medical imaging differ in this case by the imaging modality used and/or by an examination protocol used. In this case the first and the second medical image data IM_1, IM_2 are registered with each other.

In this case the first medical image data IM_1 and the second medical image data IM_2 comprise a presentation of the examination object. The examination object in this case is a patient, in particular a part of a patient. The examination object can alternatively be an animal or an object or a part thereof. For example the examination object can comprise a thorax of a patient. The first and second medical image data IM_1, IM_2 in this case comprises a voxel matrix. In this case the voxel matrix comprises at least one voxel. In other words the first and second medical image data IM_1, IM_2 are embodied as 3D medical image data. As an alternative or in addition the first and/or second medical image data IM_1, IM_2 can comprise a pixel matrix and/or a time vector. In this case the pixel matrix comprises at least one pixel or the time vector at least one point in time. In other words the first and/or second medical image data IM_1, IM_2 can be embodied as 1D or 2D or 3D or 4D medical image data. In particular the voxel matrix and the pixel matrix describe a spatial arrangement of the voxels or pixels. In particular the time vector describes a time graph of the points in time. Each voxel of the voxel matrix is assigned an image value in this case. As an alternative each pixel of the pixel matrix and/or each point in time of the time vector is assigned an image value. The mapping of the examination object to these image values describes the presentation of the examination object in the corresponding image data.

The presentation of the examination object in the first and second medical image data IM_1, IM_2 is predetermined in this case by the medical modality used and/or by the imaging protocol used. In other words the medical modality and/or the imaging protocol used specifies in which range of values the examination object will be presented or mapped by the image values. In particular in this case the presentation can differ with regard to the presentation of different characteristics of the examination object. Characteristics of the examination object are for example materials of the examination object and/or changes in potential of the examination object.

In this exemplary embodiment the first medical image data IM_1 is based on a magnetic resonance tomography (acronym: MRT) with a T1 weighting. In other words the first medical imaging is a magnetic resonance tomography, the corresponding medical modality is a magnetic resonance tomography device and the corresponding imaging protocol is a protocol for recording a T1 weighting. The second medical image data IM_2 is based on a computed tomography (acronym: CT). In other words the second medical imaging is a computed tomography, the corresponding medical modality is a computed tomography device and the corresponding imaging protocol comprises parameters for recording the second medical image data with the computed tomography device.

The first and second medical image data IM_1, IM_2 are registered with one another in this case. In particular, regions of the examination object in the first and second medical image data IM_1, IM_2 corresponding to one another are mapped to one another by the registration. In particular at least one voxel of the first medical image data IM_1 can be assigned by the registration to a voxel in the second medical image data IM_2. In particular each voxel in the first medical image data IM_1 can be assigned to a voxel in the second medical image data IM_2. In particular this assignment is unique. As an alternative at least one pixel or point in time in the first medical image data IM_1 can be assigned to a pixel or point in time in the second medical image data IM_2.

In a method step of determining DET-1 synthetic image data IM_sy the synthetic image data IM_sy is determined by applying the trainable function to the first medical image data IM_1. In this case, in this exemplary embodiment, the synthetic image data IM_sy comprises a voxel matrix. In this case each voxel of the voxel matrix of the synthetic image data IM_sy can be assigned a voxel of the voxel matrix of the first medical image data IM_1. In particular the synthetic image data IM_sy and the second medical image data IM_2 are thus also registered indirectly. Similarly, in alternate exemplary embodiments the synthetic image data IM_sy can comprise a pixel matrix or a time vector when the first medical image data IM_1 comprises a pixel matrix or a time vector. In particular each pixel or point in time of the synthetic image data IM_sy can then be assigned a pixel or point in time in the first medical image data IM_1.

In a method step of determining DET-2 a measure of similarity the measure of similarity is determined with a similarity function. The similarity function compares the synthetic image data IM_sy and the second medical image data IM_2. In this case the image values of the synthetic image data IM_sy and the second medical image data IM_2 are compared. In particular the image values of those voxels are compared in each case, which correspond to each other or are assigned to each other in accordance with the registration of the first and second medical image data IM_1, IM_2. The measure of similarity depends in this case for example on the sum of the quadratic distances. In particular the measure of similarity depends on the negative sum of the quadratic distances. As an alternative the measure of similarity can be proportional to the reciprocal value of the sum of the quadratic distances. A distance in this case is the difference of the image values of two voxels (or pixels or points in time) corresponding to one another in the synthetic image data IM_sy and in the second medical image data IM_2. In this case it is true to say that: the smaller is the sum of the quadratic distances, the greater is the measure of similarity. In other words the measure of similarity describes how similar the synthetic image data IM_sy is to the second medical image data. As an alternative or in addition the measure of similarity can depend on a cross-correlation and/or a normalized cross-correlation and/or a covariance and/or a correlation coefficient between the synthetic image data IM_sy and the second medical image data IM_2.

In a method step of adjusting AD-1 at least one parameter the at least one parameter of the trainable function is adjusted by optimization of the similarity function based on the measure of similarity. In this case the synthetic image data IM_sy depends on the at least one parameter of the trainable function. In other words the image values and thus the presentation of the examination object in the synthetic image data IM_sy depend on the at least one parameter. Thus the measure of similarity between the synthetic image data IM_sy and the second medical image data IM_2 also depends on at least one parameter. The similarity function in this case describes the dependency of the measure of similarity on the at least one parameter. The similarity function can for example be embodied as follows:

$$\Delta(\omega) = -\Sigma_i (x(\omega)_i - y_i)^2.$$

In this case ω describes the at least one parameter. Δ describes the measure of similarity, $x(\omega)i$ describes an image value i of the synthetic image data and yi describes an image value i the second medical image data corresponding to the image value i of the synthetic image data. i runs in this case over all image values the synthetic image data and the second medical image data corresponding to one another.

In the method step of adjusting AD-1 the at least one parameter the at least one parameter is adjusted in such a way that the measure of similarity is maximized. In particular the similarity function is optimized by adjusting the at least one parameter in such a way that the measure of similarity is maximized as a result of the similarity function. In other words the at least one parameter is adjusted in such a way that the synthetic image data IM_sy determined by applying the trainable function with adjusted parameters determined is as similar as possible to the second medical image data IM_2.

In an exemplary embodiment the method steps of determining DET-1 synthetic image data IM_sy, of determining DET-2 the measure of similarity and of adjusting AD-1 the at least one parameter can be carried out iteratively. In particular, in a second iteration the synthetic image data IM_sy is determined by applying the trainable function with the adjusted parameter from the previous iteration. Based on this synthetic image data IM_sy, the measure of similarity is determined once again and the at least one parameter is adjusted. In a third iteration the synthetic image data IM_sy can be determined once again by applying the trainable function to the first medical image data IM_1 with the newly adjusted parameter. In this way the trainable function can be adjusted or optimized or trained until an abort criterion is reached. The abort criterion can for example comprise a maximum number of iterations and/or a maximum measure of similarity.

In a method step of providing PROV-1 the trainable function the trainable function is provided in particular by the interface SYS.IF. In particular the trainable function can be provided for use on any given computing unit.

FIG. 2 shows an exemplary embodiment of a method step of a determination DET-2 of a measure of similarity.

In this case the method step of determining DET-2 the measure of similarity can be an exemplary embodiment of the corresponding method step of the method described in FIG. 1.

In the exemplary embodiment the method step of determining DET-2 the measure of similarity is based on an optimization method. The optimization method can in some embodiments comprise a maximization of the measure of similarity by a geometrical and/or photometric transformation of the synthetic image data IM_sy and/or the second medical image data IM_2. In particular the synthetic image data IM_sy and/or the second medical image data IM_2 can be transformed by a geometrical and/or photometric transformation in such a way that the measure of similarity is maximized. Subsequently, in the method step of adjusting AD-1 the at least one parameter, the at least one parameter can be adjusted based on the measure of similarity maximized in this way. A geometrical function in this case comprises a translating and/or rotating of the synthetic image data IM_sy and/or of the second medical image data IM_2. A photometric transformation in this case comprises in particular an adjustment of the image values of the synthetic image data IM_sy and/or of the second medical image data IM_2 for example in the form of an illumination correction.

In the exemplary embodiment shown here the method step of determining DET-2 the measure of similarity comprises a method step of determining DET-2.1 at least one first part area IM_sy.p of the synthetic image data IM_sy, of determining DET-2.2 a plurality of second part areas IM_2.p.s, IM_2.p.1, IM_2.p.2 of the second medical image data, of determining DET-2.3 a plurality of part measures of similarity and of determining DET-2.4 a similarity function.

In the method step of determining the at least one first part area IM_sy.p in the synthetic image data IM_sy, the at least one first part area IM_sy.p in the synthetic image data IM_sy is determined. The at least one first part area IM_sy.p comprises in this exemplary embodiment a cube, wherein the cube comprises at least one voxel. In particular the cube comprises 10×10×10 voxels. Alternatively, depending on the synthetic image data IM_sy, the at least one first part area IM_sy.p can comprise at least one pixel or at least one point in time. In particular the at least one first part area IM_sy.p comprises a plurality of spatially or temporally coherent voxels or pixels or points in time.

In the method step of determining the plurality of second part areas IM_2.p.s, IM_2.p.1, IM_2.p.2 of the second medical image data IM_2 the plurality of second part areas IM_2.p.s, IM_2.p.1, IM_2.p.2 in the second medical image data IM_2 is determined in a similar way. In particular the second part areas pairs of the plurality of second part areas IM_2.p.s, IM_2.p.1, IM_2.p.2 are different. In particular all second part areas of the plurality of second part areas IM_2.p.s, IM_2.p.1, IM_2.p.2 have the same geometrical form. In particular the second part areas of the plurality of second part areas IM_2.p.s, IM_2.p.1, IM_2.p.2 have the same geometrical form as the at least one first part area IM_sy.p. The geometrical form in this exemplary embodiment corresponds to a cube comprising 10×10×10 voxels. As an alternative the geometrical form can be any given parallelepiped or a parallelogram or a vector.

In the method step of determining DET-2.3 the plurality of part measures of similarity the plurality of part measures of similarity between the at least one first part area IM_sy.p and the plurality of second part areas IM_2.p.s, IM_2.p.1, IM_2.p.2 is determined. The part measures of similarity in this case are embodied in a similar way to the measure of similarity described in FIG. 1. In particular, for each second part area of the plurality of second part areas IM_2.p.s, IM_2.p.1, IM_2.p.2 a part measure of similarity with the at least one first part area IM_sy.p is determined.

In the method step of determining DET-2.4 the similarity function the similarity function based is determined based on the plurality of part measures of similarity. In this case the similarity function is based on a comparison of the at least one first part area IM_sy.p with a selected second part area of the plurality of second part areas IM_2.p.s, IM_2.p.1, IM_2.p.2. In this case the selected second part area corresponds to the second part area of the plurality of second part areas IM_2.p.s, IM_2.p.1, IM_2.p.2, for which the maximum part measure of similarity was determined. The part measure of similarity of the selected second part area thus corresponds to the measure of similarity. The similarity function depends in this case on the at least one parameter. The result of the similarity function corresponds to the measure of similarity. As an alternative the result of the similarity function can at least depend on the measure of similarity. The similarity function can be embodied in this case in accordance with description for FIG. 1. Unlike in the description for FIG. 1, in this exemplary embodiment i can only run over the image values of the first part area and of the selected second part area corresponding to one another.

In the method step of adjusting AD-1 the at least one parameter the at least one parameter is adjusted to the similarity function. In particular the at least one parameter is adjusted in such a way that the result of the similarity function and thus the measure of similarity is maximized. Thus the synthetic image data IM_sy becomes more similar to the second medical image data IM_2.

In this case the plurality of second part areas IM_2.p.s, IM_2.p.1, IM_2.p.2 is based on a start part area IM_2.p.s. In one embodiment the start part area IM_2.p.s is based on the registration of the first medical image data IM_1 and the second medical image data IM_2. In other words the start part area IM_2.p.s is based on the registration of the synthetic image data IM_sy and the second medical image data IM_2 following therefrom. In this case, in the exemplary embodiment described, the start part area IM_2.$p.s$ comprises the voxels that correspond to the voxels comprised by the at least one first part area IM_sy.p in accordance with the registration. As an alternative the start part area IM_2.$p.s$ comprises the pixels or points in time that correspond to the pixels or points in time in accordance with the registration comprised by the at least one first part area IM_sy.p. In particular this applies for the start part area IM_2.$p.s$ that is determined in the first iteration of the method in accordance with FIG. 1. As an alternative the start part area IM_2.$p.s$ is based on the selected part area of the previous or preceding iteration. In other words start part area IM_2.$p.s$ comprises those voxels (or pixels or points in time) that the second part area comprises, for which the maximum part measure of deviation was determined in the previous iteration.

The start part area IM_2.$p.s$ and each other second part area of the plurality of second part areas IM_2.$p.s$, IM_2.$p.1$, IM_2.$p.2$ cover each other at least partly in this case. In other words two second part areas IM_2.$p.s$, IM_2.$p.1$, IM_2.$p.2$ in each case comprise at least one same voxel (or pixel or point in time) in each case. In particular each second part area of the plurality of second part areas IM_2.$p.s$, IM_2.$p.1$, IM_2.$p.2$ comprises at least one voxel (or pixel or point in time), which is also comprised by the start part area IM_2.$p.s$.

A more comprehensive description of the at least one first part area IM_sy.p and the plurality of second part areas IM_2.$p.s$, IM_2.$p.1$, IM_2.$p.2$ follows in the description for FIG. 6.

FIG. 3 shows a second exemplary embodiment of a method for providing a trainable function for determination of synthetic image data IM_sy.

The method steps of receiving REC-1 first medical image data IM_1, of receiving REC-2 second medical image data IM_2, of determining DET-1 synthetic image data IM_sy, of determining DET-2 a measure of similarity, of adjusting AD-1 at least one parameter and of providing PROV-1 the trainable function are embodied in accordance with the description for FIG. 1. In particular the method step of determining DET-2 the measure of similarity can be embodied in accordance with the description for FIG. 2.

The following exemplary embodiment comprises a determination of the first medical image data IM_1 from initial medical image data.

In a method step of receiving REC-3 initial first medical image data the initial first medical image data is received in particular by the interface SYS.IF. The initial first medical image data in this case is embodied similarly to the first medical image data IM_1. In particular the initial first medical image data is likewise based on the first medical imaging. In particular the presentation of the examination object in the initial first medical image data is similar to the presentation of the examination object in the first medical image data IM_1. The initial first medical image data is not registered with the second medical image data IM_2.

In a method step of determining DET-3 initial synthetic image data the initial synthetic image data is determined by applying the trainable function. The trainable function in this case is already pretrained.

In a method step of determining DET-4 a first mapping function the first mapping function is determined by registration of the initial synthetic image data and the second medical image data IM_2. The first mapping function in this case describes how the initial synthetic image data can be mapped to the second medical image data IM_2. In particular the first mapping function describes how the initial synthetic image data must be transformed so that areas of the examination object corresponding to one another in the initial synthetic image data and the second medical image data can be mapped to one another. By applying the first mapping function to the initial synthetic image data the initial synthetic image data is mapped to the second medical image data IM_2 or registered with said data.

In a method step of determining DET-5 the first medical image data IM_1 the first medical image data IM_1 is determined by applying the first mapping function to the initial first medical image data. In particular in this way the first medical image data IM_1 and the second medical image data IM_2 are registered. In particular the first medical image data IM_1 registered in this way can be used as input data for the method described in FIG. 1. In particular the registration of the first medical image data IM_1 and the second medical image data IM_2 is thus based on a registration of the initial synthetic image data and the second medical image data IM_2, wherein the presentation of the examination object of the initial synthetic image data and the second medical image data IM_2 is at least similar.

FIG. 4 shows a third exemplary embodiment of a method for providing a trainable function for determination of synthetic image data IM_sy.

The method steps of receiving REC-1 first medical image data IM_1, of receiving REC-2 second medical image data IM_2, of determining DET-1 synthetic image data IM_sy, of determining DET-2 a measure of similarity, of adjusting AD-1 at least one parameter and of providing PROV-1 the trainable function are embodied in accordance with the description for FIG. 1. In particular the method step of determining DET-2 the measure of similarity can be embodied in accordance with the description for FIG. 2. The method steps of receiving REC-3 initial first medical image data, of determining DET-3 initial synthetic image data, of determining DET-4 a first mapping function and of determining DET-5 the first medical image data IM_1 can be embodied in accordance with the description for FIG. 3.

In the exemplary embodiment the method steps of determining DET-1 synthetic image data IM_sy, of determining DET-2 a measure of similarity, of adjusting AD-1 at least one parameter, of determining DET-6 a second mapping function and of determining DET-7 the first medical image data IM_1 are carried out iteratively. In this case the method step of determining DET-1 the synthetic image data IM_sy is based on an application of the trainable function to the first medical image data IM_1 determined in the previous iteration. The trainable function in this case depends on the at least one parameter adjusted in accordance with the previous iteration.

In the method step of determining DET-6 the second mapping function the second mapping function is determined based on a registration of the synthetic image data IM_sy and the second medical image data IM_2. The second mapping function can in this case be embodied in a similar way to the first mapping function described above. In particular the synthetic image data IM_sy can be mapped to the second medical image data IM_2 or registered with said data by applying the second mapping function to the synthetic image data IM_sy. In particular in this case regions of the examination object corresponding to one another are mapped to one another.

In the method step of determining DET-7 the first medical image data IM_1 the first medical image data IM_1 for the following iteration is determined by applying the second mapping function to the first medical image data IM_1. In particular in this way the first medical image data IM_1 is registered with the second medical image data IM_2. In particular in this case use is made of the fact that a registration between medical image data with an at least similar presentation of the examination object, as is the case for the synthetic image data IM_sy and the second medical image data IM_2, is able to be carried out more simply and effectively. In particular in this way use is made of the fact that, through a registration of the synthetic image data IM_sy with the second medical image data IM_2, the first medical image data IM_1 was also registered indirectly with the second medical image data IM_2. Thus the first medical image data IM_1 can be registered with the second medical image data IM_2 by applying the second mapping function. The first medical image data IM_1 registered in this way can subsequently be used as input data for the following iteration.

FIG. 5 shows an exemplary embodiment of registered first medical image data IM_1 and second medical image data IM_2.

The first medical image data IM_1 and the second medical image data IM_2 can be used for example as input data for a method in accordance with the descriptions for FIGS. 1 to 4.

In the exemplary embodiment the first medical image data IM_1 and the second medical image data IM_2 each comprise a schematic diagram of a lung and a heart. In other words the examination object comprises the lungs and the heart. In this exemplary embodiment the first and second medical image data IM_1, IM_2 comprise a pixel matrix comprising a plurality of pixels. In particular the first medical image data IM_1 can for example comprise a slice image of an MRT with T1 weighting. In particular the second medical image data IM_2 can for example comprise a slice image of a CT. In this case the presentation of the lungs and of the heart and differs in respect of the image values or the ranges of values of the image values. In the first medical image data IM_1 a tumor T is also depicted schematically in the lower left lobe of the lung, which is not visible in the in the second medical image data IM_2. The arrows indicate which image areas will be mapped to one another in a registration or by applying the second mapping function. In particular, areas of the lungs or the heart corresponding to one another are mapped. In particular the arrows can show the second mapping function. In particular the areas between the arrows can be registered by interpolation. The second mapping function can be shown similarly for a registration of the initial first image data and the second medical image data IM_2.

FIG. 6 shows an exemplary embodiment of synthetic image data IM_sy comprising a first part area IM_sy.p and second medical image data IM_2 comprising a plurality of second part areas IM_2.p.s, IM_2.p.1, IM_2.p.2.

The synthetic image data IM_sy has been determined in this example by applying the trainable function to the first medical image data IM_1 in accordance with FIG. 5. The second medical image data IM_2 corresponds to the second medical image data IM_2 from FIG. 5. The presentation of the lungs and of the heart in the synthetic image data IM_sy corresponds to the presentation in the second medical image data IM_2. The at least one first part area IM_sy.p comprises the pixels enclosed by the square. In other words the square describes which pixels are comprised by the at least one first part area IM_sy.p. The start part area IM_2.p.s is identified in the second medical image data IM_2 by the square with a solid line. The start part area IM_2.p.s is based here on a registration of the at least one first part area IM_sy.p with the second medical image data IM_2. The registration in this case can in particular be based on the first or second mapping function. The squares with dashed lines identify further second part areas IM_2.p.1, IM_2.p.2 of the plurality of second part areas IM_2.p.s, IM_2.p.1, IM_2.p.2. The further second part areas IM_2.p.1, IM_2.p.2 in this case are in particular rotated and/or translated relative to the start part area IM_2.p.s. In other words the further second part areas IM_2.p.1, IM_2.p.2 are defined by a geometrical translation of the square enclosing the start part area IM_2.p.s. The further second part areas IM_2.p.1, IM_2.p.2 overlap in this case at least partly with the start part area IM_2.p.s. The further second part areas IM_2.p.1, IM_2.p.2 in this case have the same geometrical form as the at least one first part area IM_sy.p and the start part area IM_2.p.s. In this case all part areas IM_sy.p, IM_2.p.s, IM_2.p.1, IM_2.p.2 comprise the same number of pixels.

FIG. 7 shows an exemplary embodiment of a use of a trainable function provided.

The method steps of receiving REC-1 first medical image data IM_1, of receiving second medical image data IM_2 and of determining synthetic image data IM_sy are embodied similarly to the description for FIG. 1.

In a method step of providing PROV-2 the synthetic image data IM_sy the synthetic image data IM_sy is provided in particular by the interface SYS.IF. The synthetic image data IM_sy can be provided in this case for a further use. For example the synthetic image data IM_sy can be provided for display by a screen or monitor. As an alternative or in addition the synthetic image data IM_sy can be provided for a comparison with the second medical image data IM_2. As an alternative or in addition the synthetic image data IM_sy can be provided for storage in a database and/or in a cloud.

FIG. 8 shows a training system SYS for providing a trainable function for determination of synthetic image data IM_sy.

The training system SYS shown is embodied to carry out an inventive method for providing a trainable function for determination of synthetic image data IM_sy. The training system SYS comprises an interface SYS.IF, a computing unit SYS.CU and a memory unit SYS.MU.

The training system SYS can in particular be a computer, a microcontroller or integrated circuit (IC). As an alternative the training system SYS can be a real or virtual computer network (a technical term for a real computer network is a cluster, a technical term for a virtual computer network is cloud). The training system SYS can be embodied as a virtual system, which can be embodied on a computer or a real computer network or a virtual computer network (a technical term is virtualization).

The interface SYS.IF can be a hardware or software interface (for example a PCI bus, USB or Firewire). The computing unit SYS.CU can comprise hardware and/or software elements, for example a microprocessor or what is known as an FPGA (Field Programmable Gate Array). The memory unit SYS.MU can be embodied as Random Access Memory (RAM) or as permanent mass storage (hard disk, USB stick, SD card, Solid State Disk (SSD)).

The interface SYS.IF can in particular comprise a plurality of sub-interfaces, which carry out various method steps of the respective inventive method. In other words the interface SYS.IF can be embodied as a plurality of interfaces SYS.IF. The computing unit SYS.CU can in particular comprise a number of sub-computing units, which carry out various method steps of the respective inventive method. In other words the computing unit SYS.CU can be embodied as a plurality of computing units SYS.CU. When the interface SYS.IF is a hardware device (e.g., a microprocessor, FPGA, Central Processing Unit (CPU), a controller, an arithmetic logic unit (ALU), a digital signal processor, a microcomputer, a microprocessor, etc.), the interface SYS.IF may be configured to perform the method steps by executing instructions stored by memory unit SYS.MU.

Where this has not happened explicitly but is sensible and in the spirit example embodiments, individual exemplary embodiments, individual or their part aspects or features can be combined with one another or interchanged without departing from the framework of example embodiments. Advantages of example embodiments described with regard to one exemplary embodiment, also apply, where they can be transferred, without this being explicitly stated, to other exemplary embodiments.

The invention claimed is:

1. A computer-implemented method for providing a trainable function for determination of synthetic image data, the method comprising:
   receiving first medical image data,
      the first medical image data being based on a first medical imaging of an examination object;
   receiving second medical image data,
      the second medical image data being based on a second medical imaging of the examination object, the first and the second medical imaging differ in at least one of the imaging modality used or in an imaging protocol used, the first and the second medical image data are registered with one another;
   determining the synthetic image data by applying the trainable function to the first medical image data;
   determining a measure of similarity with a similarity function by comparison of the synthetic image data and the second medical image data, the determining the measure of similarity is based on an optimization method, and the optimization method comprises a maximization of the measure of similarity by at least one of a geometrical or photometric transformation of at least one of the synthetic image data or of the second medical image data, the optimization method including,
      determining at least one first part area of the synthetic image data,
      determining a plurality of second part areas of the second medical image data,
      determining a plurality of part measures of similarity between the at least one first part area and the plurality of second part areas, and
      determining the similarity function based on the plurality of part measures of similarity, wherein the similarity function is based on a comparison of the first part area of the synthetic image data and a selected second part area of the second medical image data, and
         the selected second part area corresponds to that area of the plurality of second part areas with the maximum part measure of similarity;
   adjusting at least one parameter of the trainable function by optimization of the similarity function based on the measure of similarity; and
   providing the trainable function.

2. The computer-implemented method as claimed in claim 1, wherein at least one of the first or second medical imaging is at least one of a histopathology, an X-ray imaging, an angiography, a computed tomography, a magnetic resonance tomography, an ultrasound imaging, an electrocardiography, a positron emission tomography, a single photon emission computed tomography or an optical coherence tomography.

3. The computer-implemented method as claimed in claim 1, wherein the at least one first part area and the plurality of second part areas have the same geometrical form.

4. The computer-implemented method as claimed in claim 1, wherein the determining of the plurality of second part areas is based on a start part area, and
   the start part area is based on the registration of the first medical image data and the second medical image data.

5. The computer-implemented method as claimed in claim 1, wherein the determining synthetic image data, the determining a measure of similarity and the adjusting at least one parameter of the trainable function are carried out iteratively,
   wherein in one iteration a start part area is based on the selected second part area of the previous iteration.

6. The computer-implemented method as claimed in claim 1, wherein a start part area and each other second part area of the plurality of second part areas at least partly cover each other.

7. The computer-implemented method as claimed in claim 1, further comprising:
   receiving initial first medical image data, the initial first medical image data being based on the first medical imaging of the examination object;
   determining initial synthetic image data by applying the trainable function to the initial first medical image data;
   determining a first mapping function by registering the initial synthetic image data and the second medical image data; and
   determining the first medical image data by applying the first mapping function to the initial first medical image data.

8. The computer-implemented method as claimed in claim 1, wherein the determining synthetic image data, the determining a measure of similarity and the adjusting at least one parameter of the trainable function are carried out iteratively, the computer-implemented method further comprising:
   determining a second mapping function by registering the synthetic image data and the second medical image data; and
   determining the first medical image data for the following iteration by applying the second mapping function to the first medical image data.

9. The computer-implemented method as claimed in claim 1, wherein
   the trainable function comprises a Generative Adversarial Network,
   the Generative Adversarial Network comprises a generator and a discriminator, and the generator advantageously comprises a Dense Unit Network (U net).

10. The computer-implemented method as claimed in claim 1, wherein
    the adjusting at least one parameter of the trainable function is based on an optimization of a target function,
    the target function comprises a similarity function,
    the measure of similarity depends on the similarity function, and
    a weighting of the similarity function in the target function is variable.

11. The computer-implemented method as claimed in claim 10, wherein the determining synthetic image data, the determining a measure of similarity and the adjusting at least one parameter of the trainable function are carried out iteratively, and the weighting of the similarity function increases with the iterations.

12. The computer-implemented method as claimed in claim 10, wherein the weighting of the similarity function is adjusted based on a quality of the registration of the synthetic image data and the second medical image data, wherein, the weighting of the similarity function increases based on the quality of the registration of the synthetic image data and the second medical image data.

13. A computer-implemented use of the trainable function provided in accordance with the computer-implemented method of claim 1, comprising:

determining the synthetic image data by applying the trainable function to the first medical image data; and providing the synthetic image data.

14. A non-transitory computer-readable memory medium storing instructions, when executed by a training system, are configured to cause the training system to perform the method of claim 1.

15. A training system for providing a trainable function for determination of synthetic image data, comprising:

an interface; and a computing device, the interface being configured to receive first medical image data, the first medical image data being based on a first medical imaging of an examination object, the interface being further configured to receive second medical image data, the second medical image data being based on a second medical imaging of the examination object, the first and the second medical imaging differ by at least one of an imaging modality used or by an imaging protocol used, the first and the second medical image data are registered with one another, the computing device being configured to determine synthetic image data by applying the trainable function to the first medical image data, the computing device being further configured to determine a measure of similarity with a similarity function by comparison of the synthetic image data and the second medical image data, the determination of the measure of similarity is based on an optimization method, and the optimization method comprises a maximization of the measure of similarity by at least one of the geometrical of photometric transformation of at least one of the synthetic image data or of the second medical image data, the optimization method including, determining at least one first part area of the synthetic image data, determining a plurality of second part areas of the second medical image data, determining a plurality of part measures of similarity between the at least one first part area and the plurality of second part areas, and determining the similarity function based on the plurality of part measures of similarity, wherein the similarity function is based on a comparison of the first part area of the synthetic image data and a selected second part area of the second medical image data, and the selected second part area corresponds to that area of the plurality of second part areas with the maximum part measure of similarity, the computing device being further configured to adjust at least one parameter of the trainable function by optimization of the similarity function based on the measure of similarity, and the interface being further configured to provide the trainable function.

* * * * *